June 4, 1957  R. C. PURKHISER  2,794,658
INSULATED PIPE UNION WITH DIP TUBE HANGER
Filed May 19, 1951
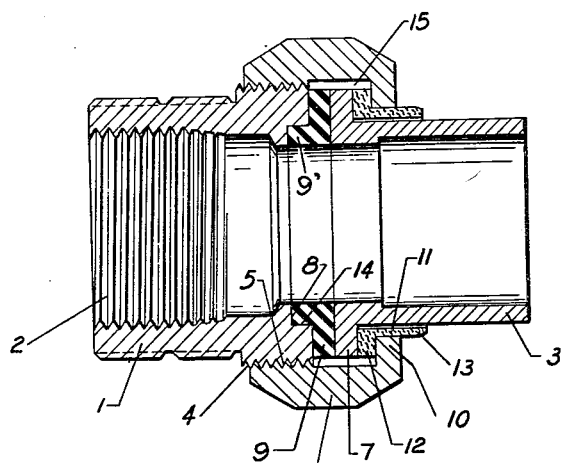
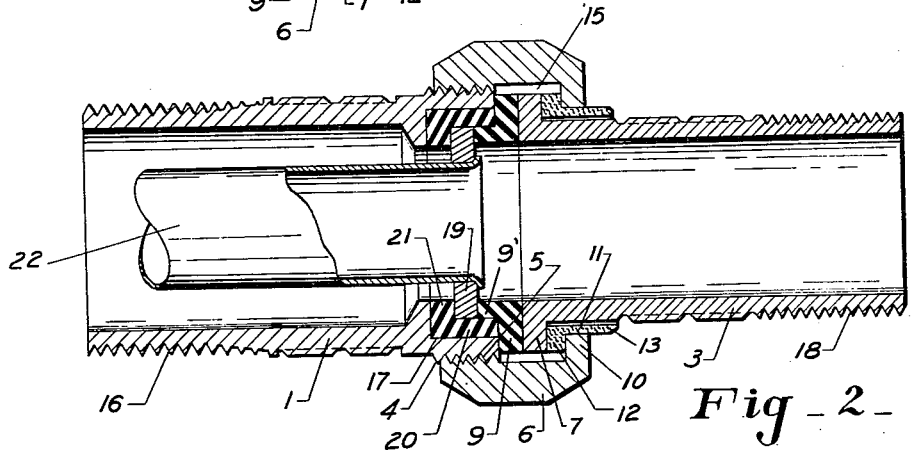
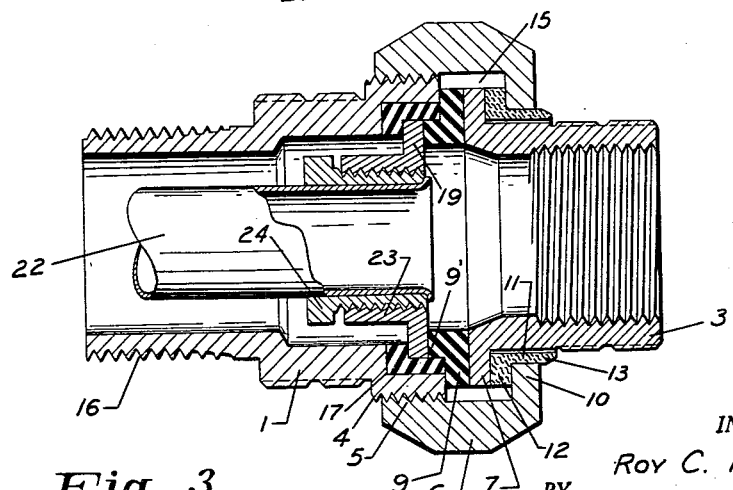
INVENTOR.
Roy C. Purkhiser
BY
Frank H. Harmon
ATTORNEY United States Patent Office 2,794,658
Patented June 4, 1957

2,794,658

INSULATED PIPE UNION WITH DIP TUBE HANGER

Roy C. Purkhiser, Cleveland, Ohio

Application May 19, 1951, Serial No. 227,196

2 Claims. (Cl. 285—52)

This invention relates in general to insulated pipe unions and more particularly to improvements in threaded type unions, as distinguished from pipe unions employing flanges and connecting bolts.

One of the primary objects of my invention is to provide an improved threaded type insulated pipe union that is simple and inexpensive to produce and install.

Another object is to provide a threaded type insulated pipe union that will effectively insure against fluid leakage and against galvanic or electrolytic action regardless of the metallic composition of the joined pipe members.

A further object is to provide in such a threaded type insulated pipe union means for mounting and insulating a dip tube, which latter may be used in a water heater tank and in which the union is employed for connecting the water heater into the piping of a water supply system.

With the foregoing and other objects in view, the invention resides in the combination of parts and details of construction hereinafter set forth in the following specification and appended claims, certain embodiments thereof being illustrated in the accompanying drawings, in which:

Figure 1 is a view in longitudinal section taken through one form of the union assembly;

Fig. 2 is a view in longitudinal section taken through another form of union assembly including a dip tube and means for mounting the same in the union; and Figure 3 is a view in longitudinal section taken through another form of union assembly employing a different means for mounting the dip tube.

Referring more particularly to Figure 1 of the drawings, member 1 of the union is of ferrous metal, and is shown to be provided with internal pipe threads 2 near one end to receive a standard threaded section of ferrous pipe. The opposite end is provided with external threads 4 to mate with internal threads 5 of a threaded coupling nut 6 of ferrous metal. The opposite end is provided with a recess 8 to receive the flange 9' and position a sealing and insulating gasket 9 of suitable material. Member 3 of the union is of nonferrous material such as brass or copper. One end is arranged for solder joint connection with copper or brass tubing. The other end is provided with a flange 7 which is engaged in spaced relation by a flange 10 on coupling nut 6.

There is also provided a flanged insulating bushing 11 positioned between the nut flange 10 and member 3. The inside diameters of gasket 9, the base of the recess in member 1 and member 3 are preferably approximately the same. Bushing 11 has a radial flange 12 and an end 13 that projects beyond flange 10 of nut 6.

Figure 1 shows the union fully assembled with the two union members 1 and 3 and the gasket 9 and bushing 11 properly aligned and the nut 6 tightened by screwing the nut on threads 4 of member 1. The outside diameter of flange 7 is arranged to leave an insulating air gap 15 between its peripheral surface and the inside diameter of nut 6.

By this arrangement the non-ferrous member 3 is electrically separated from nut 6 by flanged bushing 11 and by air gap 15.

Ferrous member 1 and non-ferrous member 3 are insulated from each other by sealing and insulating gasket 9. Its flange 9' also acts as a positioning member as it fits in recess 8 against shoulder 14 of member 1. This flange 9' of gasket 9 also performs the important function of providing maximum separation of the ferrous and non-ferrous members where they are subjected to the action of the water, or other fluid, carried by the piping system into which the union is incorporated.

The walls of the passageway at the junction of the gasket with the union members are without projections or recesses which might trap metallic or other substances in the transmitted fluid or other material. The trapping of certain substances at this point might easily result in bridging of the insulating gasket 9 to form an electrical path for galvanic or electrolytic currents. The present invention is especially directed to means for preventing this.

Figure 2 shows another form my invention may take to satisfy different specific requirements. Ferrous member 1 is here provided with external pipe threads 16 at one end for connection with a pipe fitting or for direct connection with a tank or boiler. The opposite end of member 1 is finished with a recess 17 to receive and position other parts of the assembly yet to be described in detail. Non-ferrous member 3 is finished at its outer end with external threads 18 for connection with a coupling, or other device or component part of the piping system in which the union is employed.

The two members 1 and 3 are shown in Figure 2 to be secured in proper assembled relationship and correct alignment by the flanged nut 6. Non-ferrous member 3 is electrically separated from nut 6 by the flanged bushing 11 and by the air gap 15. Members 1 and 3 are insulated from each other by the sealing and insulating gasket 9. The projecting flange 9' of this gasket 9 positions the gasket and secures dip tube holder 19. A second insulating and sealing gasket 20 with flange 21 fits into and is positioned in a recess 17 in member 1. Dip tube holder 19 is separated from contact with member 1 by gasket 20 and is properly secured between flange 21 of gasket 20 and flange 9' of gasket 9. The dip tube supported by the dip tube holder 19 is shown at 22. In Figure 2 the insulating gasket 9 performs the same function as that in Figure 1 but is positioned by gasket 20 instead of in recess 8 against shoulder 14 in member 1, as in Figure 1. Gasket 20 effectively separates and insulates the non-ferrous dip tube holder 19 from ferrous member 1.

This arrangement provides complete insulation from galvanic or electrolytic currents between members 1 and 3 and dip tube holder 19. It provides a simple mounting for the dip tube that is easily assembled and disassembled. The dip tube is an essential component of water heaters of conventional design. The most satisfactory dip tubes are usually made of such non-ferrous metals as brass or copper. If mounted in direct contact with a galvanized or unprotected ferrous surface of the water tank, or of a fitting directly connected with the tank, a galvanic action would result which would cause rapid destruction of the tank. By reason of my invention there has been provided an insulated union including a dip tube mounting that will greatly increase the effective life of a water heater connected into a piping system.

The modification shown in Figure 3 differs from that shown in Figure 2 principally with respect to the dip tube holder. Here the dip tube holder 19 is modified to include a longitudinal internally screw-threaded body to receive an externally screw-threaded bushing 24 that carries the dip tube 22.

It is to be understood that the foregoing disclosure has covered only certain specific applications of my invention. Variations in the types of connections at either or both ends of the union members may be found expedient for varying conditions. Also, arrangements for connecting pipe or tubing of different sizes will be advantageous and other variations in the details of construction may be employed within the scope of my invention.

The union of my invention is effective in its function of preventing the passage of electrolytic currents when used to connect pipes or other components of a piping system of similar metallic characteristics. It is also effective in electrolytic protection and in addition checks galvanic action when pipes or tubes or other components of a piping system of dissimilar metals are connected by the union.

I claim:

1. A pipe union comprising in combination two main members, the first member having an externally threaded portion at the end opposed to the second member and a recess in the face of the opposed end at its inside diameter, said second member having its opposed end flanged, a retaining member flanged at one side to engage the flange of said second member in spaced relation and threaded at the other side to engage the threaded portion of the said first member, a flanged bushing of insulating material interposed between the flanged end of said second member and the flange of the retaining member to provide electrical separation of the members, the peripheral surface of the flange of the second member and the adjacent surface of the retaining member having an air gap therebetween to complete the electrical separation of said two members, a sealing and insulating gasket formed with a flange annularly disposed and extending outward from one face at the inside diameter of said gasket, said gasket being interposed between the opposed faces of said first member and said second member to insure sealing against leakage and to provide electrical separation of said two members, a second sealing and insulating gasket arranged to be received by the recess provided in the face of said first member and formed to receive and position a dip tube holder of material similar in characteristics to that of the dip tube which it is intended to support, said dip tube holder being arranged to be received by the second insulating gasket so that it is completely separated by the gasket from contact with said first member, the flange of the first gasket being arranged to secure the dip tube holder from movement and to position the said first gasket by contact with the inside surface of the said second gasket.

2. A pipe union comprising in combination two main members, one of which is of ferrous material and the other of which is of non-ferrous material, said ferrous member having an externally threaded portion at the end opposed to the non-ferrous member in the assembled position, said ferrous member also having a recess in the face of the opposed end at its inside diameter, said non-ferrous member having its end opposed to said ferrous member flanged, a retaining member of ferrous material flanged at one side to engage the flange of said non-ferrous member in spaced relation and threaded at the other side to engage the threaded portion of the said ferrous member, a flanged bushing of insulating material interposed between the flanged end of said non-ferrous member and the flange of said retaining member to provide electrical separation of said two members, the peripheral surface of the flange of said non-ferrous member and the adjacent surface of said retaining member having an air gap therebetween to complete the electrical separation of said two members, a sealing and insulating gasket formed with a flange extending axially outward from one face at the inside diameter of said gasket, said gasket being interposed between the opposed faces of said ferrous member and said non-ferrous member to insure sealing against leakage and to provide electrical separation of said two members, a second sealing and insulating gasket arranged to be received by the recess provided in the face of said ferrous member and formed to receive and position a dip tube holder of material similar in characteristics to that of the dip tube which it is intended to support, said dip tube holder being arranged to be received by the second insulating gasket so that it is completely separated by the gasket from contact with said ferrous member, the flange of the first gasket being arranged to secure the dip tube holder from movement, and to position the said first gasket by contact with the inside surface of the said second gasket.

References Cited in the file of this patent

UNITED STATES PATENTS

| | | |
|---|---|---|
| 75,151 | Gould | Mar. 3, 1868 |
| 506,034 | Burtchaell | Oct. 3, 1893 |
| 2,141,404 | Penick | Dec. 27, 1938 |
| 2,204,316 | Miller | June 11, 1940 |
| 2,257,385 | Keegan | Sept. 30, 1941 |
| 2,278,479 | Parker | Apr. 7, 1942 |
| 2,653,834 | Purkhiser | Sept. 29, 1953 |